United States Patent
Nakao et al.

(10) Patent No.: US 11,128,173 B2
(45) Date of Patent: Sep. 21, 2021

(54) NONCONTACT POWER SUPPLY APPARATUS

(71) Applicant: Omron Corporation, Kyoto (JP)

(72) Inventors: Goro Nakao, Inazawa (JP); Toshiyuki Zaitsu, Kizugawa (JP)

(73) Assignee: Omron Corporation, Kyoto (JP)

( * ) Notice: Subject to any disclaimer, the term of this patent is extended or adjusted under 35 U.S.C. 154(b) by 233 days.

(21) Appl. No.: 16/468,201

(22) PCT Filed: Nov. 24, 2017

(86) PCT No.: PCT/JP2017/042282
§ 371 (c)(1),
(2) Date: Jun. 10, 2019

(87) PCT Pub. No.: WO2018/159030
PCT Pub. Date: Sep. 7, 2018

(65) Prior Publication Data
US 2020/0083748 A1     Mar. 12, 2020

(30) Foreign Application Priority Data
Mar. 2, 2017  (JP) .............................. JP2017-039548

(51) Int. Cl.
*H02J 50/12* (2016.01)
*H02J 50/80* (2016.01)
*H02J 5/00* (2016.01)

(52) U.S. Cl.
CPC .............. *H02J 50/12* (2016.02); *H02J 5/005* (2013.01); *H02J 50/80* (2016.02)

(58) Field of Classification Search
CPC ............. H02J 50/12; H02J 50/80; H02J 5/005
See application file for complete search history.

(56) References Cited

U.S. PATENT DOCUMENTS

| 10,819,161 B2* | 10/2020 | Bunsen | .................... H02J 5/005 |
| 2008/0211455 A1* | 9/2008 | Park | ......................... H02J 50/80 320/108 |

(Continued)

FOREIGN PATENT DOCUMENTS

| JP | 2006-74848 A | 3/2006 |
| JP | 2016-32345 A | 3/2016 |

(Continued)

OTHER PUBLICATIONS

Office Action in counterpart Korean Patent Application No. 10-2019-7015141 dated Jul. 3, 2020 (5 pages).

(Continued)

*Primary Examiner* — Nghia M Doan
(74) *Attorney, Agent, or Firm* — Osha Bergman Watanabe & Burton LLP

(57) ABSTRACT

A power reception device 3 of a noncontact power supply apparatus 1 has a resonance circuit 20 that resonates at a first frequency, a voltage detection circuit 27 that measures an output voltage from the resonance circuit 20 and calculates a measured value of the output voltage, and a transmitter 28 that transmits a signal including information about the measured value of the output voltage to a power transmission device 2. The power transmission device 2 of the noncontact power supply apparatus 1 has a transmission coil 13 for supplying power to the power reception device, a power supply circuit 10 that supplies AC power having an adjustable switching frequency to the transmission coil 13, a receiver 14 that receives the signal including the information about the measured value of the output voltage, and a control circuit 16 that controls, in accordance with the measured value of the output voltage, the switching frequency so that the transmission coil 13 and the power supply circuit 10 can continue a soft switching operation.

4 Claims, 5 Drawing Sheets

(56) References Cited

U.S. PATENT DOCUMENTS

| | | | |
|---|---|---|---|
| 2015/0349541 A1* | 12/2015 | Yamamoto | H02J 50/60 |
| | | | 307/104 |
| 2015/0357863 A1 | 12/2015 | Sadakata et al. | |
| 2017/0256993 A1 | 9/2017 | Nakamura et al. | |
| 2018/0105049 A1 | 4/2018 | Maikawa | |
| 2018/0183271 A1* | 6/2018 | Nakao | H04B 5/0075 |
| 2018/0183272 A1* | 6/2018 | Nakao | H02J 5/005 |
| 2018/0351391 A1* | 12/2018 | Park | H02J 5/005 |

FOREIGN PATENT DOCUMENTS

| | | | |
|---|---|---|---|
| JP | 2016-220293 A | 12/2016 | |
| WO | 2014/129178 A1 | 8/2014 | |
| WO | 2016/125392 A1 | 8/2016 | |
| WO | 2016/162996 A1 | 10/2016 | |

OTHER PUBLICATIONS

International Search Report issued in Application No. PCT/JP2017/042282, dated Feb. 13, 2018 (2 pages).

Written Opinion issued in International Application No. PCT/JP2017/042282, dated Feb. 13, 2018 (3 pages).

International Preliminary Report on Patentability issued in Application No. PCT/JP2017/042282, dated Jul. 25, 2018 (7 pages).

Tohi et al.; "Maximum Efficiency of Contactless Power Transfer System using k and Q;" The Institute of Electrical Engineers of Japan Technical Meeting Document; SPC, Semiconductor Power Converter Technical Meeting; 2011 (6 pages).

Fujita et al.; "Contactless Power Transfer Systems using Series and Parallel Resonant Capacitors;" IEEJ Transactions D (IEEJ Transactions on Industry Applications), 2007, 127 (2), pp. 174-180 (6 pages).

* cited by examiner

NONCONTACT POWER SUPPLY APPARATUS

FIELD

The present invention relates to a noncontact power supply apparatus.

BACKGROUND

Conventionally, techniques for transmitting electric power through space without using metal contacts or the like, or so-called noncontact power supply (also called wireless power supply) have been studied.

As one of noncontact power supply techniques, a method of supplying power by electromagnetic induction is known. In a method of supplying power by electromagnetic induction, a series-primary parallel-secondary (power reception side) capacitors method (hereinafter referred to as the SP method) is used (see, for example, NPL 1). According to the SP method, a capacitor is connected in series with a transmission coil serving as a part of a transformer on the primary side (power transmission side) and a capacitor is connected in parallel with a reception coil serving as another part of the transformer on the secondary side (power reception side).

In the SP method, the resonance circuit that includes the reception coil and the capacitor on the power reception side causes parallel resonance and the output from the resonance circuit is a constant current output. Thus, it is generally more difficult to perform control in the SP method, compared with the series-primary series-secondary capacitors method (hereinafter referred to as the SS method), in which the output on the power reception side is a constant voltage output. This is because electric appliances are generally controlled by a constant voltage. Further, in the power transfer using series resonance on the power transmission side, the resonance current on the power transmission side increases during the power supply and energy transmission efficiency declines when the coupling coefficient between the transmission coil on the power transmission side and the reception coil on the power reception side is very low (for example, coupling coefficient k<0.2). Therefore, it is preferable not to use series resonance on the power transmission side for the power transfer in a use in which the coupling coefficient cannot be kept high. Further, when series resonance on the power transmission side is not used, it is possible to transmit greater power by using parallel resonance on the power reception side. Therefore, a noncontact power supply apparatus is preferably has a circuit configuration in which the resonance circuit on the power reception side chiefly performs power transfer when the coupling coefficient is very low in other words, it is possible to increase power transfer efficiency with a circuit configuration adopting the SP method rather than the SS method.

On the other hand, a technique has been proposed for outputting a constant voltage on the power reception side in the SP method by selecting appropriate capacitance values for the capacitors in the resonance circuits on the power transmission side and the power reception side (see, for example, NPL 2).

CITATION LIST

Non Patent Literature

[NPL 1] Tohi et "Maximum Efficiency of Contactless Power Transfer System using k and Q", The Institute of Electrical Engineers of Japan Technical Meeting Document, SPC. Semiconductor Power Converter Technical Meeting, 2011.

[NPL 2] Fujita et al., "Contactless Power Transfer Systems using Series and Parallel Resonant Capacitors", IEEJ Transactions D (IEEJ Transactions on Industry Applications), 2007, 127 (2), pp 174-180.

SUMMARY

Technical Problem

However, even by the technique disclosed in NPL 2, the capacitance of the capacitor of the resonance circuit for a constant output voltage depends on the coupling coefficient; therefore it is difficult to apply this technique when the noncontact power supply apparatus is used in an environment where the coupling coefficient dynamically changes.

To address this, an objective of the present invention is to provide a noncontact power supply apparatus that suppresses a decline in energy transmission efficiency even when the coupling coefficient between the transmission coil and the reception coil dynamically changes.

Solution to Problem

As an embodiment of the present invention, there is provided a noncontact power supply apparatus including a power transmission device and a power reception device to which electric power is transmitted from the power transmission device without contact. In this noncontact power supply apparatus, the power reception device includes a resonance circuit that includes a reception coil that receives electric power from the power transmission device and a resonance capacitor connected in parallel with the reception coil, the resonance circuit resonating at a first frequency, a voltage detection circuit that measures an output voltage from the resonance circuit and obtains a measured value of the output voltage, and a transmitter that transmits a signal including information indicating the measured value of the output voltage to the power transmission device, whereas the power transmission device includes a transmission coil that supplies electric power to the power reception device, a power supply circuit that supplies AC power having an adjustable switching frequency to the transmission coil, a receiver that receives the signal including the information indicating the measured value of the output voltage, and a control circuit that controls the switching frequency in accordance with the measured value of the output voltage in such a way as to allow the transmission coil and the power supply circuit to continue soft switching operation.

In this noncontact power supply apparatus, it is preferable that the control circuit of the power transmission device controls the switching frequency within a frequency range that includes the first frequency at an anticipated coupling coefficient between the transmission coil and the reception coil.

In such a case, it is preferable that the frequency range within which the switching frequency is controlled is set in such a way that a minimum frequency of the frequency range is equal to the first frequency at a minimum value of the anticipated coupling coefficient. It is preferable that the control circuit sets the switching frequency at a maximum frequency of the frequency range when the measured value of the output voltage exceeds a first voltage.

Further, in this noncontact power supply apparatus, it is preferable that the control circuit of the power transmission device controls the switching frequency in such a way as to decrease a difference between the measured value of the output voltage and the output voltage in a case in which the resonance circuit resonates.

Advantageous Effects of Invention

A noncontact power supply apparatus according to the present invention has an advantageous effect of suppressing a decline of energy transmission efficiency even when the coupling coefficient between the transmission coil and the reception coil dynamically changes.

DESCRIPTION OF EMBODIMENTS

A noncontact power supply apparatus according to an embodiment of the present invention will be described below with reference to the drawings. This noncontact power supply apparatus supplies power from a power transmission device that does not include a resonance circuit and directly supplies AC power to a transmission coil to a power reception device that includes a resonance circuit that causes parallel resonance. The inventors noted that, in an SP method, when the resonance frequency of the resonance circuit of the power transmission device is brought closer to the resonance frequency of the resonance circuit of the power reception device, the maximum power that can be supplied increases but the energy transmission efficiency does not necessarily improve because the current passing the transmission coil included in the resonance circuit of the power transmission device also increases especially when the coupling coefficient is low.

Figure 1A:
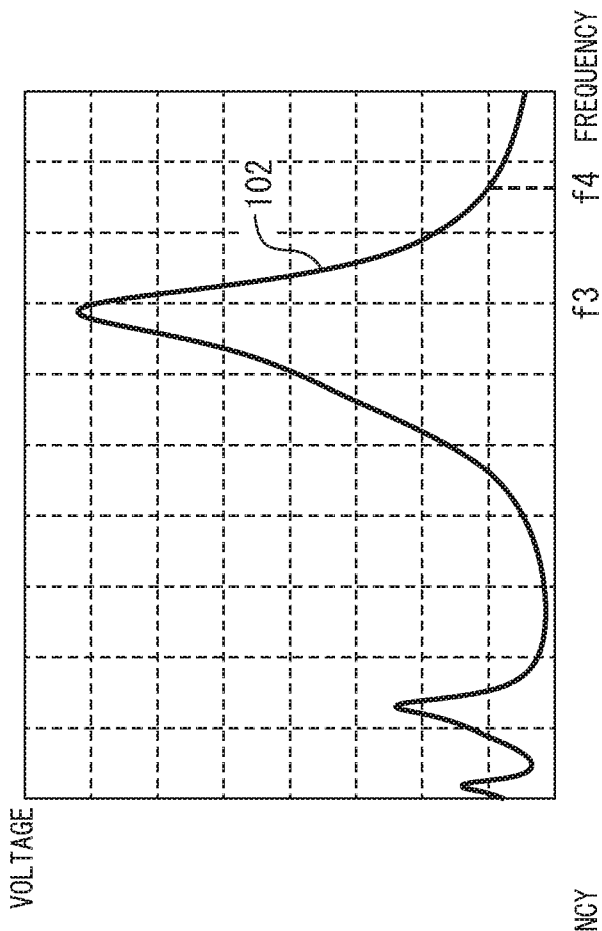
FIG. 1A illustrates an example of frequency characteristics of an output voltage of a resonance circuit on a power reception side in an SP method in a case in which a resonance frequency of the resonance circuit on the power reception side is greater than the resonance frequency of the resonance circuit on the power transmission side.
Figure 1B:
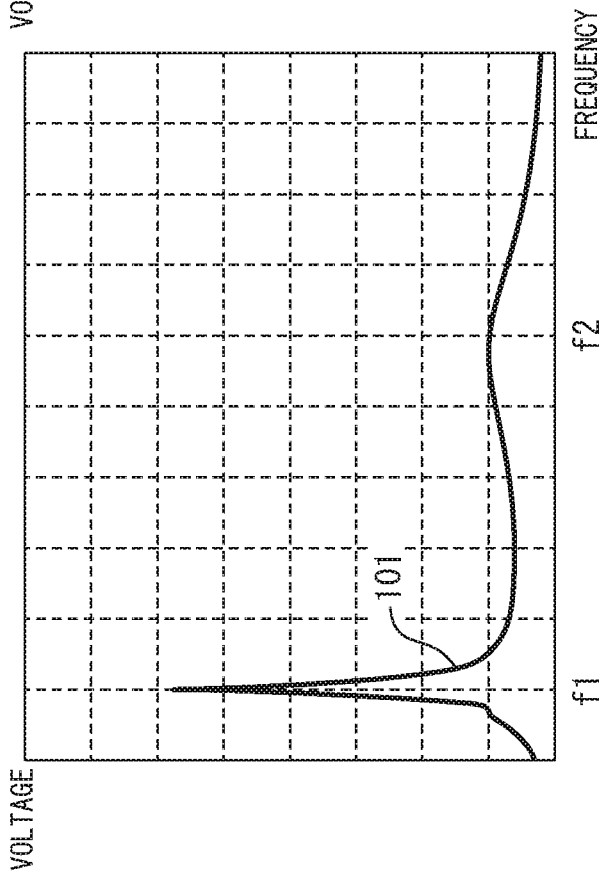
FIG. 1B illustrates an example of frequency characteristics of the output voltage of the resonance circuit on the power reception side in the SP method in a case in which the resonance frequency of the resonance circuit on the power transmission side is approximately equal to the resonance frequency of the resonance circuit on the power reception side.

FIG. 1A illustrates an example of frequency characteristics of the output voltage of the resonance circuit on the power reception side in the SP method in a case in which the resonance frequency of the resonance circuit on the power reception side is greater than the resonance frequency of the resonance circuit on the power transmission side. Further, FIG. 1B illustrates an example of frequency characteristics of the output voltage of the resonance circuit on the power reception side in the SP method in a case in which the resonance frequency of the resonance circuit on the power transmission side is approximately equal to the resonance frequency of the resonance circuit on the power reception side. In FIG. 1A and FIG. 1B, frequency is plotted along the horizontal axis and voltage is plotted along the vertical axis. The graph 101 illustrated in FIG. 1A represents frequency characteristics of the output voltage of the resonance circuit on the power reception side in a case in which the resonance frequency of the resonance circuit on the power reception side is greater than the resonance frequency of the resonance circuit on the power transmission side. Further, the graph 102 illustrated in FIG. 1B represents frequency characteristics of the output voltage of the resonance circuit on the power reception side in a case in which the resonance frequency of the resonance circuit on the power transmission side is approximately equal to the resonance frequency of the resonance circuit on the power reception side. As illustrated by the graph 101, when the resonance frequency of the resonance circuit on the power reception side is greater than the resonance frequency of the resonance circuit on the power transmission side, output voltage peaks are observed at the resonance frequency f1 of the resonance circuit of the power transmission side or the resonance frequency f2 of the resonance circuit on the power reception side. On the other hand, as illustrated by the graph 102, when the resonance frequency of the resonance circuit on the power transmission side is approximately equal to the resonance frequency of the resonance circuit on the power reception side, an output voltage peak is observed at the resonance frequency f3, which is common to the power transmission side and the power reception side. The peak voltage is higher than either of the voltage peaks in the case in which the resonance frequency of the resonance circuit on the power reception side is greater than the resonance frequency of the resonance circuit on the power transmission side.

Figure 2A:
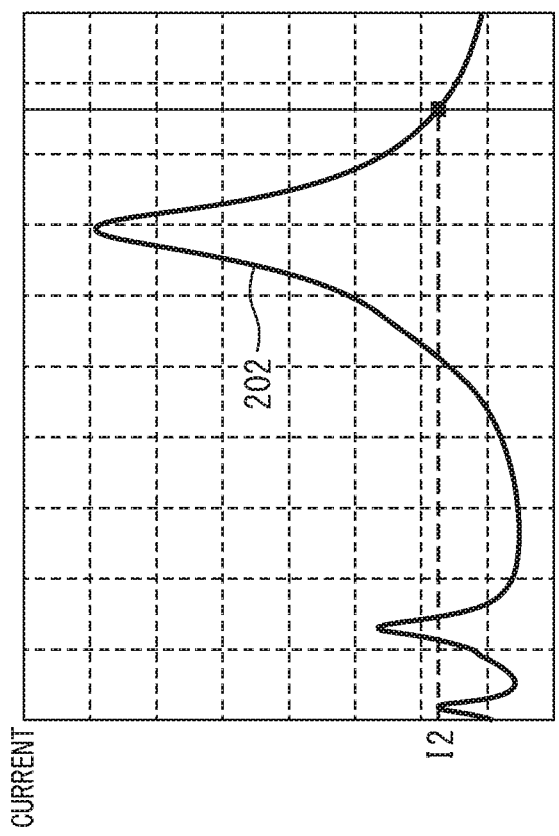
FIG. 2A illustrates frequency characteristics of a current passing through a transmission coil when the resonance circuits on the power transmission side and the power reception side are identical to the resonance circuits in FIG. 1A.
Figure 2B:
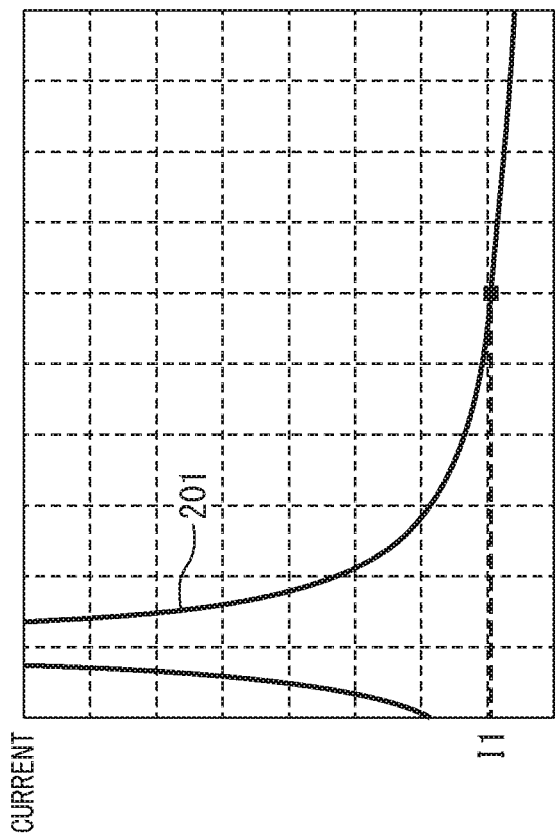
FIG. 2B illustrates frequency characteristics of the current passing through the transmission coil when the resonance circuits on the power transmission side and the power reception side are identical to the resonance circuits in FIG. 1B.

FIG. 2A illustrates frequency characteristics of the current passing through the transmission coil of the resonance circuit on the power transmission side when the resonance circuits on the power transmission side and the power reception side are identical to the resonance circuits in FIG. 1A. Further, FIG. 2B illustrates frequency characteristics of the current passing through the transmission coil of the resonance circuit on the power transmission side when the resonance circuits on the power transmission side and the power reception side are identical to the resonance circuits in FIG. 1B. In FIG. 2A and FIG. 2B, frequency is plotted along the horizontal axis and current is plotted along the vertical axis. The graph 201 illustrated in FIG. 2A represents the frequency characteristics of the current passing through the transmission coil that corresponds to the frequency characteristics of the output voltage of the resonance circuit on the power reception side illustrated in FIG. 1A. The graph 202 illustrated in FIG. 2B represents the frequency characteristics of the current passing through the transmission coil that corresponds to the frequency characteristics of the output voltage of the resonance circuit on the power reception side illustrated in FIG. 1B. As illustrated in the graph 201 and the graph 202, even when the output voltage of the resonance circuit on the power reception side is the same, a greater current passes through the transmission coil when the resonance frequency of the resonance circuit on the power transmission side is approximately equal to the resonance frequency of the resonance circuit on the power reception side. For example, as illustrated by the graph 101 and the graph 102, the output voltage at the resonance frequency f2 on the power reception side in the case in which the resonance frequency of the resonance circuit on the power reception side is greater than the resonance frequency of the resonance circuit on the power transmission side is approximately equal to the output voltage at the frequency f4 in the case in which the resonance frequency of the resonance circuit on the power transmission side is approximately equal to the resonance frequency of the resonance circuit on the power reception side. In contrast, as illustrated by the graph 201 and the graph 202, the current value I2 passing through the transmission coil at the frequency f4 in the case in which the resonance frequency of the resonance circuit on the power transmission side is approximately equal to the resonance frequency of the resonance circuit on the power reception side is greater than the current value I1 that passes through the transmission coil at the resonance frequency f2 in the case in which the resonance frequency of the resonance circuit on the power reception side is greater than the resonance frequency of the resonance circuit on the power transmission side. It can be seen from this that a higher energy transmission efficiency is achieved by making the difference greater between the resonance frequency of the resonance circuit on the power transmission side and the resonance frequency of the resonance circuit on the power reception side and by using AC power having a frequency at which the resonance circuit on the power transmission side does not resonate, rather than making the resonance frequency of the resonance circuit on the power transmission side equal to the resonance frequency of the resonance circuit on the power reception side. This is because, when the resonance frequency of the resonance circuit on the power transmission side is equal to the resonance frequency of the resonance circuit on the power reception side, the lower the coupling coefficient between the transmission coil and the reception coil, the smaller the mutual inductance between the transmission coil and the reception coil, and as a result, the current passing through the transmission coil increases irrespective of the load.

Thus, this noncontact power supply apparatus has no resonance circuit on the power transmission side and suppresses the current passing through the transmission coil on the power transmission side by controlling the switching frequency of the AC power supplied to the transmission coil within a frequency range that includes the resonance frequency of the resonance circuit on the power reception side and that is set in accordance with the anticipated coupling coefficient. Further, this noncontact power supply apparatus allows the transmission coil on the power transmission side to continue soft switching operation by measuring the output voltage of the resonance circuit on the power reception side and controlling the switching frequency in such a manner that the measured value does not exceed a threshold value.

Figure 3:
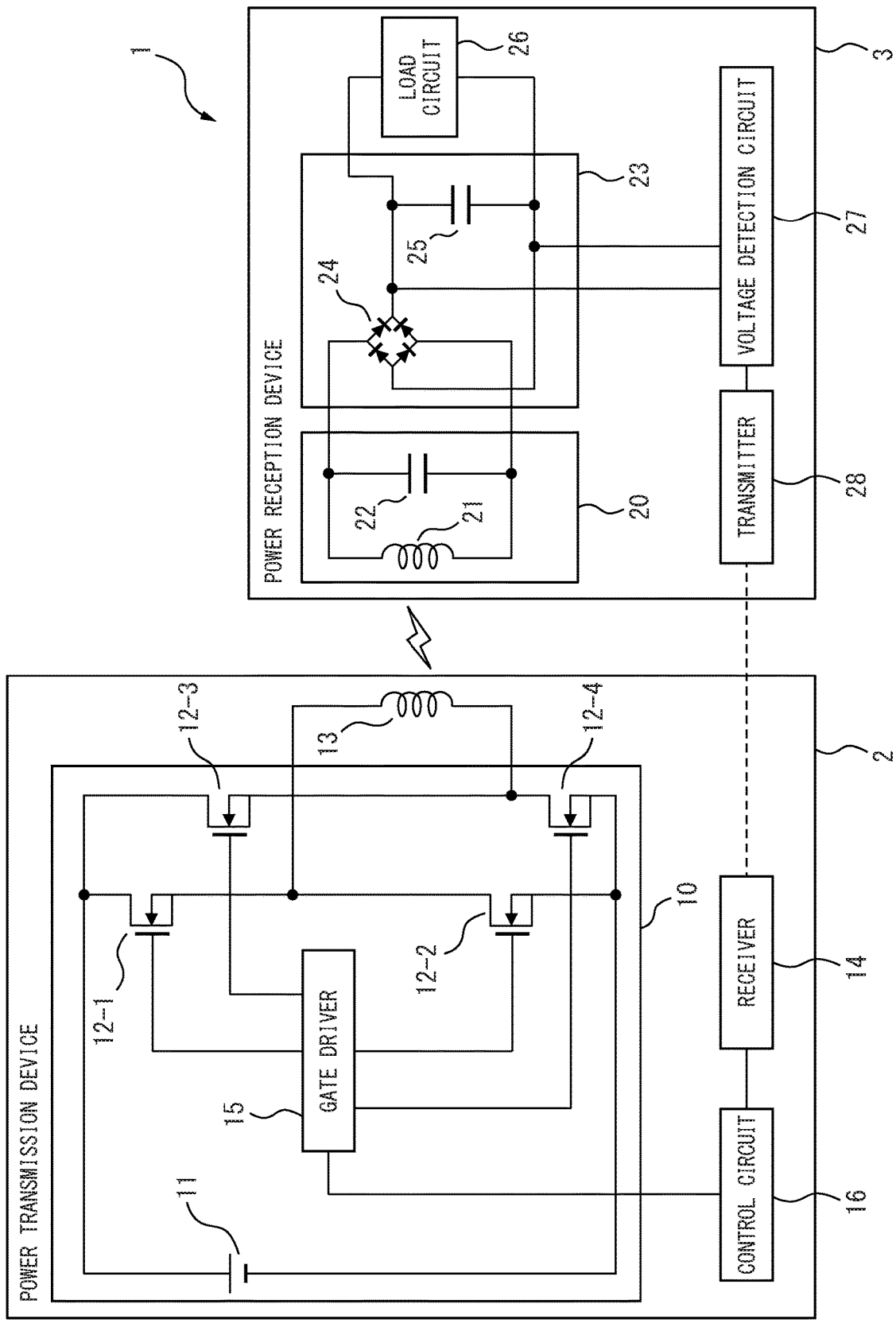
FIG. 3 is a schematic configuration view of a noncontact power supply apparatus according to an embodiment of the present invention.

FIG. 3 is a schematic configuration view of a noncontact power supply apparatus according to an embodiment of the present invention. As illustrated in FIG. 3, the noncontact power supply apparatus 1 includes a power transmission device 2 and a power reception device 3 to which power is supplied from the power transmission device 2 through space. The power transmission device 2 includes a power supply circuit 10, a transmission coil 13, a receiver 14, a gate driver 15, and a control circuit 16. On the other hand, the power reception device 3 includes a resonance circuit 20 that includes a reception coil 21 and a capacitor 22, a rectification and smoothing circuit 23, a load circuit 26, a voltage detection circuit 27, and a transmitter 28.

First, the power transmission device 2 will be described. The power supply circuit 10 supplies AC power having an adjustable switching frequency to the transmission coil 13. To do so, the power supply circuit 10 includes a DC power source 11 and four switching elements 12-1 to 12-4.

The DC power source 11 supplies DC power having a prescribed voltage. To do so, the DC power source 11 may include, for example, a battery. Alternatively, the DC power source 11 may be connected with a commercial AC power source and include a full-wave rectification circuit and a smoothing capacitor to convert the AC power supplied by the AC power source to DC power.

The four switching elements 12-1 to 12-4 may be, for example, n-channel MOSFETs. Among the four switching elements 12-1 to 12-4, the switching element 12-1 and the switching element 12-2 are connected in series between the positive electrode terminal and the negative electrode terminal of the DC power source 11. In the present embodiment, the switching element 12-1 is connected on the positive electrode side of the DC power source 11, whereas the switching element 12-2 is connected on the negative electrode side of the DC power source 11. The drain terminal of the switching element 12-1 is connected with the positive electrode terminal of the DC power source 11, and the source terminal of the switching element 12-1 is connected with the drain terminal of the switching element 12-2. The source terminal of the switching element 12-2 is connected with the negative electrode terminal of the DC power source 11. Furthermore, the source terminal of the switching element 12-1 and the drain terminal of the switching element 12-2 are connected with one end of the transmission coil 13, and the source terminal of the switching element 12-2 is connected with the other end of the transmission coil 13 via the switching element 12-4.

Similarly, among the four switching elements 12-1 to 12-4, the switching element 12-3 and the switching element 12-4 are connected in parallel with the switching element 12-1 and the switching element 12-2 and in series between the positive electrode terminal and the negative electrode terminal of the DC power source 11. The switching element 12-3 is connected on the positive electrode side of the DC power source 11, whereas the switching element 12-4 is connected on the negative electrode side of the DC power source 11. The drain terminal of the switching element 12-3 is connected with the positive electrode terminal of the DC power source 11, and the source terminal of the switching element 12-3 is connected with the drain terminal of the switching element 12-4. The source terminal of the switching element 12-4 is connected with the negative electrode terminal of the DC power source 11. Furthermore, the source terminal of the switching element 12-3 and the drain terminal of the switching element 12-4 are connected with the other end of the transmission coil 13.

Further, the gate terminals of the switching elements 12-1 to 12-4 are connected with the control circuit 16 via the gate driver 15. Further, each of the switching elements 12-1 to 12-4 may have its gate terminal connected with its own source terminal via a resistor to ensure that the switching element turns on when a voltage to turn on the switching element is applied. The switching elements 12-1 to 12-4 switch on and off at an adjustable switching frequency in accordance with a control signal from the control circuit 16. In the present embodiment, the pair of switching element 12-1 and the switching element 12-4 and the pair of the switching element 12-2 and the switching element 12-3 are alternatingly switched on and off to turn off the switching element 12-2 and the switching element 12-3 when the switching element 12-1 and the switching element 12-4 are turned on and, conversely, to turn off the switching element 12-1 and the switching element 12-4 when the switching element 12-2 and the switching element 12-3 are turned on. Thus, the DC power supplied from the DC power source 11 is converted into AC power having the switching frequency of the switching elements and supplied to the transmission coil 13.

The transmission coil 13 transmits the AC power supplied from the power supply circuit 10 to the resonance circuit 20 of the power reception device 3 through space.

Every time the receiver 14 receives a wireless signal from the transmitter 28 of the power reception device 3, the receiver 14 takes out information indicating a measured value of the output voltage of the resonance circuit 20 of the power reception device 3 and outputs the information to the control circuit 16. To do so, the receiver 14 includes, for example, an antenna for receiving a wireless signal in accordance with a prescribed wireless communication standard and a communication circuit for demodulating the signal. Note that the prescribed wireless communication standard may be, for example, ISO/IEC 15693, ZigBee (registered trademark), or Bluetooth (registered trademark).

The gate driver 15 receives a control signal for switching on and off the switching elements 12-1 to 12-4 from the control circuit 16 and, in accordance with the control signal, alters the voltages applied to the gate terminals of the switching elements 12-1 to 12-4. In other words, upon receiving a control signal to switch on the switching element 12-1 and the switching element 12-4, the gate driver 15 applies to the gate terminal of the switching element 12-1 and the gate terminal of the switching element 12-4 such relatively high voltages as to turn on the switching element 12-1 and the switching element 12-4. This allows the current from the DC power source 11 to pass through the switching element 12-1, the transmission coil 13, and the switching element 12-4. On the other hand, upon receiving a control signal to switch off the switching element 12-1 and the switching element 12-4, the gate driver 15 applies to the gate terminal of the switching element 12-1 and the gate terminal of the switching element 12-4 such relatively low voltages as to turn off the switching element 12-1 and the switching element 12-4 as not to allow a current from the DC power source 11 from passing through the switching element 12-1 and the switching element 12-4. Similarly, the gate driver 15 controls the voltages applied to the gate terminals of the switching element 12-2 and the switching element 12-3. Thus, when the switching element 12-1 and the switching element 12-4 are turned off and the switching element 12-2 and the switching element 12-3 are turned on, a current from the DC power source 11 passes through the switching element 12-3, the transmission coil 13, and the switching element 12-2.

The control circuit 16 includes, for example, a nonvolatile memory circuit, a volatile memory circuit, an arithmetic operation circuit, and an interface circuit for the connection with other circuits. Every time the control circuit 16 receives a measured value of the output voltage from the receiver 14, the control circuit 16 controls the switching frequency of the power supply circuit 10 and the transmission coil 13 in accordance with the measured value.

To do so, the control circuit 16 in the present embodiment controls the switching elements 12-1 to 12-4 in such a way that the pair of the switching element 12-1 and the switching element 12-4 and the pair of the switching element 12-2 and the switching element 12-3 are alternatingly switched on and that the duration in which the pair of the switching element 12-1 and the switching element 12-4 is on and the duration in which the pair of the switching element 12-2 and the switching element 12-3 is on are equal in one period, the period corresponding to the switching frequency. Note that, in switching on and off the pair of the switching element 12-1 and the switching element 12-4 and the pair of the switching element 12-2 and the switching element 12-3, the control circuit 16 may set a dead time during which both of the pairs of switching elements are switched off in order to prevent a short circuit of the DC power source 11, which occurs when the pair of the switching element 12-1 and the switching element 12-4 and the pair of the switching element 12-2 and the switching element 12-3 are simultaneously on.

Details of the control of the switching elements 2-1 to 12-4 by the control circuit 16 will be described later.

Next, the power reception device 3 will be described.

The resonance circuit 20 is an example of a first resonance circuit and is an LC resonance circuit that includes a reception coil 21 and a capacitor 22 connected in parallel with each other. One end of the reception coil 21 included in the resonance circuit 20 is connected with one end of the capacitor 22 and with one input terminal of a rectification and smoothing circuit 23. The other end of the reception coil 21 is connected with the other end of the capacitor 22 and with the other input terminal of the rectification and smoothing circuit 23.

The reception coil 21 receives electric power from the transmission coil 13 by resonating with the AC current passing through the transmission coil 13 of the power transmission device 2. The reception coil 21 outputs the received electric power to the rectification and smoothing circuit 23 via the capacitor 22. Note that the number of turns in the winding of the reception coil 21 and the number of turns in the winding of the transmission coil 13 of the power transmission device 2 may be identical or different. Further, in the present embodiment, the inductance of the reception coil 21 and the capacitance of the capacitor 22 of the resonance circuit 20 are set in such a way as to satisfy the equation below.

[Equation 1]

$$f_{r2} = \frac{1}{2\pi\sqrt{C_p \cdot L_{r2}}} \qquad (1)$$

$$L_{r2} = L_2(1-k)(1+k)$$

Wherein, $C_p$ is the capacitance of the capacitor 22 and $L_2$ is the inductance of the reception coil 21. $L_2$ is the inductance of the reception coil 21 when the transmission coil 13 is short-circuited, and k is a coupling coefficient of the transmission coil 13 and the reception coil 21, and $f_{r2}$ is the resonance frequency of the resonance circuit 20. For example, for an anticipated coupling coefficient (for example, k=0.1 to 0.5), the inductance of each coil and the capacitance of each capacitor may be set to satisfy $f_{r2}$=100 kHz.

One end of the capacitor 22 is connected with the reception coil 21 and the other end of the capacitor 22 is connected with the rectification and smoothing circuit 23. The capacitor 22 outputs the electric power received by the reception coil 21 to the rectification and smoothing circuit 23.

The rectification and smoothing circuit 23 includes a full-wave rectification circuit 24 that includes four diodes connected in a bridge and a smoothing capacitor 25. The rectification and smoothing circuit 23 rectifies and smooths the electric power received by the reception coil 21 and the capacitor 22 to convert the electric power into DC power. The rectification and smoothing circuit 23 outputs the DC power to the load circuit 26.

The voltage detection circuit 27 measures the output voltage between both terminals of the hill-wave rectification circuit 24 at every prescribed period. Since the output voltages between both terminals of the full-wave rectification circuit 24 correspond one-to-one to the output voltages of the resonance circuit 20, measured values of the output voltage between both terminals of the full-wave rectification circuit 24 are indirectly measured values of the output voltage of the resonance circuit 20. The voltage detection circuit 27 may be, for example, any of various known voltage detection circuits that can detect a DC voltage. Note that the prescribed period is, for example, the period set to be longer than the period corresponding to the anticipated minimum value of the switching frequency of the power supply circuit 10 and the transmission coil 13 of the power transmission device 2, for example, 10 milliseconds to 1 second. The voltage detection circuit 27 outputs a voltage detection signal indicating the measured value of the output voltage to the transmitter 28.

Every time the transmitter 8 receives a voltage detection signal from the voltage detection circuit 27, the transmitter 28 generates a wireless signal that includes information indicating the measured value of the output voltage indicated by the voltage detection signal and transmits the wireless signal to the receiver 14 of the power transmission device 2. To do so, the transmitter 28 includes, for example, a communication circuit that generates a wireless signal in accordance with a prescribed wireless communication standard and an antenna for transmitting the signal. Note that the prescribed wireless communication standard may be, for example, ISO/IEC 15693, ZigBee (registered trademark), or Bluetooth (registered trademark) as in the case of the receiver 14. Further, the information indicating the measured value of the output voltage may be, for example, the measured value itself of the output voltage or information indicating a rank to which the measured value belongs when the range of possible values that a measured value of the output voltage can take is divided into ranks. In such a case, ranks may be, for example, a rank of being lower than a reference voltage, a rank of being not lower than the reference voltage and lower than an upper limit voltage, and a rank of being not lower than the maximum voltage. The reference voltage and the upper limit voltage will be described later.

An operation of the noncontact power supply apparatus 1 will be described in detail below.

In the present embodiment, every time the control circuit 16 of the power transmission device 2 receives a measured value of the output voltage from the receiver 14, the control circuit 16 controls the switching frequency, i.e., controls the period of switching on and off the pair of the switching element 12-1 and the switching element 12-4 and the pair of the switching element 12-2 and the switching element 12-3, within a prescribed frequency range. Note that the prescribed frequency range is preferably set, for example, to include the resonance frequency $f_{r2}$ of the resonance circuit 20 of the power reception device 3 at the anticipated coupling coefficient in order to increase the power that the power reception device 3 can receive.

As is apparent from the equation (1), as the coupling coefficient k increases, the resonance frequency $f_{r2}$ of the resonance circuit 20 of the power reception device 3 also increases. Further, as the resistance of the load circuit 26 increases, the conduction angle of the diodes included in the full-wave rectification circuit 24 gets narrower and, as a result, the effect of the capacitance of the reception coil 21 is suppressed and therefore the resonance frequency $f_{r2}$ increases.

Thus, the minimum frequency fmin of the prescribed frequency range may be, for example, equal to the resonance frequency $f_{r2}$ that corresponds to the minimum value of the anticipated coupling coefficient and the minimum value of the anticipated resistance of the load circuit 26 when the power supply is executed. Further, maximum frequency fmax of the prescribed frequency range is preferably set to be a frequency higher than the resonance frequency $f_{r2}$ corresponding to the maximum value of the anticipated coupling coefficient and the maximum value of the anticipated resistance of the load circuit 26. Note that, when the resistance of the load circuit 26 is constant or when the variance of the resistance value of the load circuit 26 is negligible, the minimum frequency fmin may be equal to a resonance frequency $f_{r2}$ that corresponds to the minimum value of the anticipated coupling coefficient.

Further, the control circuit 16 controls the switching frequency in such a way that the value of the voltage measured by the voltage detection circuit 27 is closer to the reference voltage in order to suppress the current passing through the transmission coil 13 and to improve the energy transmission efficiency. Here, the reference voltage may be, for example, the output voltage of the resonance circuit 20 in a case in which the resonance frequency $f_{r2}$ is equal to the minimum frequency fmin.

Further, in order to improve the energy transmission efficiency, it is preferable that the power supply circuit 10 and the transmission coil 13 of the power transmission device 2 continue to operate with soft switching (inductive operation). In order for the power supply circuit 10 and the transmission coil 13 to operate with soft switching, it is preferable that the phase of the current passing through the transmission coil 13 delays from the phase of the switching voltage. This allows, for example, a current to pass from the source terminal to the drain terminal of the switching element 12-1 when the switching element 12-1 and the switching element 12-4 are turned on, and the power supply circuit 10 and the transmission coil 13 thereby operate with soft switching, suppressing an occurrence of switching loss.

However, as the product of the coupling coefficient and the Q value of the reception coil 21 (hereinafter referred to as the kQ-product), which is expressed by the equation (2) below, increases, the phase of the current passing through the transmission coil 13 relatively advances.

[Equation 2]

$$Q = R\sqrt{\frac{C_P}{L_{r2}}} \qquad (2)$$

Wherein, R is the resistance of the load circuit 26. When the kQ-product is greater than a certain value, the phase of the current passing through the transmission coil 13 advances relative to the phase of the switching voltage, and the power supply circuit 10 and the transmission coil 13 operate with hard switching (capacitive operation), resulting in a decline in the energy transmission efficiency. Further, as the kQ-product increases, the output voltage of the resonance circuit 20 increases. Thus, whether the power supply circuit 10 and the transmission coil 13 operate with soft switching or under hard switching can be determined from the value measured by the voltage detection circuit 27.

Thus, in the present embodiment, an upper limit voltage Vth is set with respect to the values of the output voltage measured by the voltage detection circuit 27. The upper limit voltage Vth is set at a value calculated by subtracting a prescribed offset voltage from the maximum value of the output voltage between both terminals of the full-wave rectification circuit 24 in a case in which the power supply circuit 10 and the transmission coil 13 operate with soft switching (the offset value may be, for example, a value calculated by multiplying the maximum value of the output voltage by 0.005 to 0.02). The control circuit 16 controls the switching frequency in such a way that the value of the output voltage measured by the voltage detection circuit 27 is not more than the upper limit voltage Vth to allow the power supply circuit 10 and the transmission coil 13 to continue soft switching operation and thereby suppresses a decline in energy transmission efficiency.

Note that the maximum frequency fmax, the minimum frequency fmin, the reference voltage Vr, and the upper limit voltage Vth are stored in non-volatile memory included in the control circuit 16.

Figure 4:
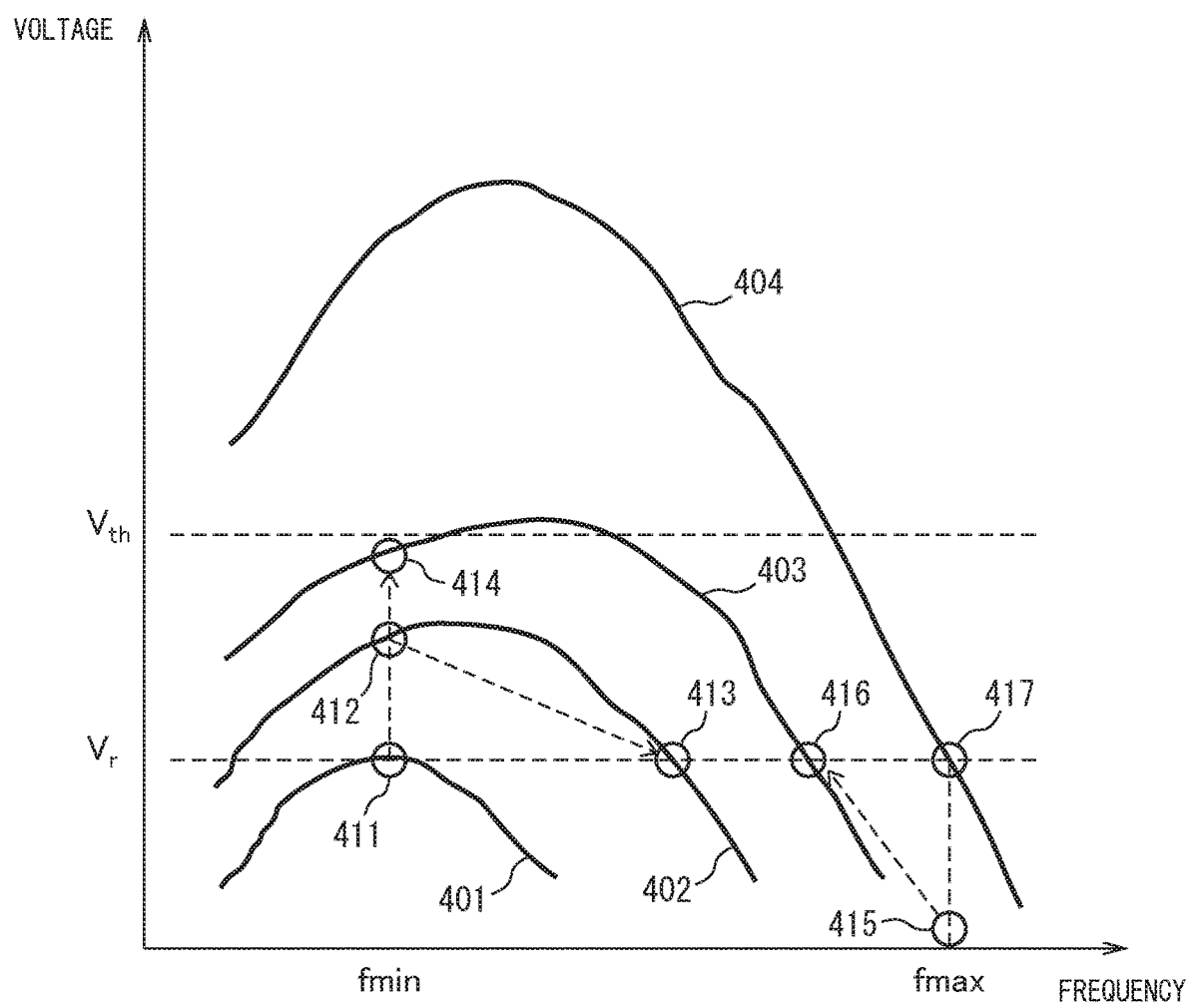
FIG. 4 illustrates an example of relationship between switching frequency control and frequency characteristics of output voltages at different coupling coefficients.

FIG. 4 illustrates an example of relationship between switching frequency control and frequency characteristics of output voltages at different coupling coefficients. In FIG. 4, frequency is plotted along the horizontal axis and voltage is plotted along the vertical axis. The graphs 401 to 404 respectively represent frequency characteristics of the output voltages between both terminals of the full-wave rectification circuit 24 corresponding to coupling coefficients Id to k4. Wherein, k1<k2<k3<k4, the coupling coefficient k1 is the minimum value of the anticipated coupling coefficient, and the coupling coefficient k4 is the maximum value of the anticipated coupling coefficient.

When the coupling coefficient of the transmission coil 13 and the reception coil 23 is k1, the control circuit 16 performs control in such a way that the switching frequency is equal to the minimum frequency fmin. This makes the output voltage equal to the reference voltage Vr as illustrated by the state 411 and the power is supplied to the power reception device 3 without a decline in energy transmission efficiency. Then, when the positional relationship between the power transmission device 2 and the power reception device 3 changes and the coupling coefficient changes from k1 to k2, the output voltage increases as illustrated by the state 412 even when the power supply circuit 10 and the transmission coil 13 perform the switching operation at the minimum frequency fmin. In this case, however, since the output voltage does not exceed the upper limit voltage Vth, the control circuit 16 can bring the output voltage closer to the reference voltage Vr as illustrated by the state 413 by incrementally increasing the switching frequency by a prescribed frequency alteration amount (for example, by 5 kHz to 10 kHz).

On the other hand, when the positional relationship between the power transmission device 2 and the power reception device 3 changes and the coupling coefficient changes from k1 to k3, the output voltage comes close to the upper limit voltage Vth as illustrated by the state 414. Therefore, when the control circuit 16 incrementally increases the switching frequency by the prescribed frequency alteration amount, the output voltage will exceed the upper limit voltage Vth. To address this, when the measured value of the output voltage reaches the upper limit voltage Vth, the control circuit 16 decreases the output voltage by setting the switching frequency at the maximum frequency fmax. Note that, in this case, since the maximum frequency fmax is higher than the resonance frequency of the resonance circuit 20, the output voltage is lower than the reference voltage Vr as illustrated by the state 415. Thus, after setting the switching frequency at the maximum frequency fmax, the control circuit 16 may decrease the switching frequency by the prescribed frequency alteration amount until the measured value of the output voltage reaches the reference voltage Vr as illustrated by the state 416.

Further, when the positional relationship between the power transmission device 2 and the power reception device 3 changes and the coupling coefficient changes from k1 to k4, the output voltage exceeds the upper limit voltage Vth. In this case, the control circuit 16 sets the switching frequency at the maximum frequency fmax. This brings the output voltage closer to the reference voltage Vr as illustrated by the state 417.

Note that, when the measured value of the output voltage is lower than the reference voltage Vr, the control circuit 16 may incrementally decrease the switching frequency by the prescribed frequency alteration amount until the measured value of the output voltage reaches the reference voltage Vr.

To sum up the above-described operations, when the value of the output voltage measured by the voltage detection circuit 27 is lower than the reference voltage Vr, the control circuit 16 decreases the switching frequency by a prescribed frequency. On the other hand, when the measured value of the output voltage is higher than the reference voltage Vr and lower than the upper limit voltage Vth, the control circuit 16 increases the switching frequency by the prescribed frequency. When the measured value of the output voltage is equal to or higher than the upper limit voltage Vth, the control circuit 16 sets the switching frequency at the maximum frequency fmax. Note that, when the absolute value of the difference between the measured value of the output voltage and the reference voltage Vr is in a prescribed allowance range (for example, ±3 to 5% of the reference voltage Vr), the control circuit 16 may keep the switching frequency unchanged.

Note that the output voltage of the resonance circuit 20 and the output voltage between both terminals of the full-wave rectification circuit 24 can be decreased also by decreasing the switching frequency below the resonance frequency $f_{r2}$ of the resonance circuit 20 of the power reception device 3. Thus, according to a variation, the maximum frequency fmax of the frequency range in which the switching frequency is adjusted may be set at the resonance frequency $f_{r2}$ of the resonance circuit 20 of the power reception device 3 at the minimum value of the anticipated coupling coefficient. In such a case, when the coupling coefficient rises and the measured value of the output voltage exceeds the reference voltage Vr as a result, the control circuit 16 may incrementally decrease the switching frequency by the prescribed frequency alteration amount. Further, when the measured value of the output voltage reaches the upper limit voltage Vth, the control circuit 16 may set the switching frequency at the minimum frequency fmin. Conversely, when the measured value of the output voltage is lower than the reference voltage Vr, the control circuit 16 may incrementally increase the switching frequency by the prescribed frequency alteration amount.

As described above, this noncontact power supply apparatus suppresses an increase of the current passing through the transmission coil even when the coupling coefficient declines, by not including a resonance circuit in the power transmission device. Further, this noncontact power supply apparatus monitors the output voltage of the resonance circuit of the power reception device, controls the switching frequency in such a way as to make the output voltage lower than the upper limit voltage, and allows the power supply circuit and the transmission coil of the power transmission device to continue soft switching operation. Furthermore, this noncontact power supply apparatus controls the switching frequency in such a way that the measured value of the output voltage comes closer to the output voltage when the resonance circuit of the power reception device resonates and thereby allows the power transmission device to continue to operate at a switching frequency close to the resonance frequency of the resonance circuit of the power reception device. This noncontact power supply apparatus thereby suppresses a decline of energy transmission efficiency even when the coupling coefficient between the transmission coil and the reception coil dynamically changes.

Note that, according to a variation, the voltage detection circuit 27 may measure the output voltage between both terminals of the smoothing capacitor 25. In such a case, one of the terminals of the voltage detection circuit 27 may be connected with a point between one end of the smoothing capacitor 25 and one end of the load circuit 26, whereas the other of the terminals of the voltage detection circuit 27 may be connected with a point between the other end of the smoothing capacitor 25 and the other end of the load circuit 26. Further, when the voltage detection circuit 27 is a circuit that can measure AC voltage, the voltage detection circuit 27 may directly measure the output voltage between both output terminals of the resonance circuit 20.

Further, according to another variation, the control circuit 16 may alter the switching frequency by a greater amount when the absolute value of the difference between the measured value of the output voltage and the reference voltage is greater. This allows the control circuit 16 to bring the output voltage close to the reference voltage in a short time.

Further, in the power transmission device 2, the power supply circuit that supplies AC power to the transmission coil 13 may have a circuit configuration different from the one in the above-described embodiment as long as it is a circuit that can variably adjust the switching frequency.

Figure 5A:
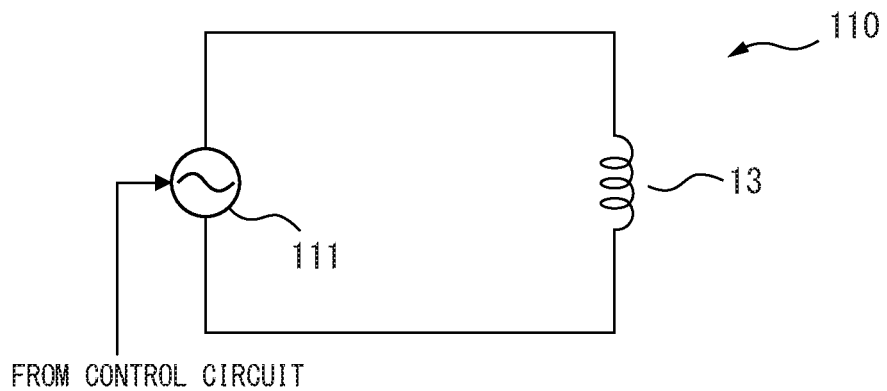
FIG. 5A to FIG. 5C are respectively circuit diagrams of power supply circuits according to variations.
Figure 5B:
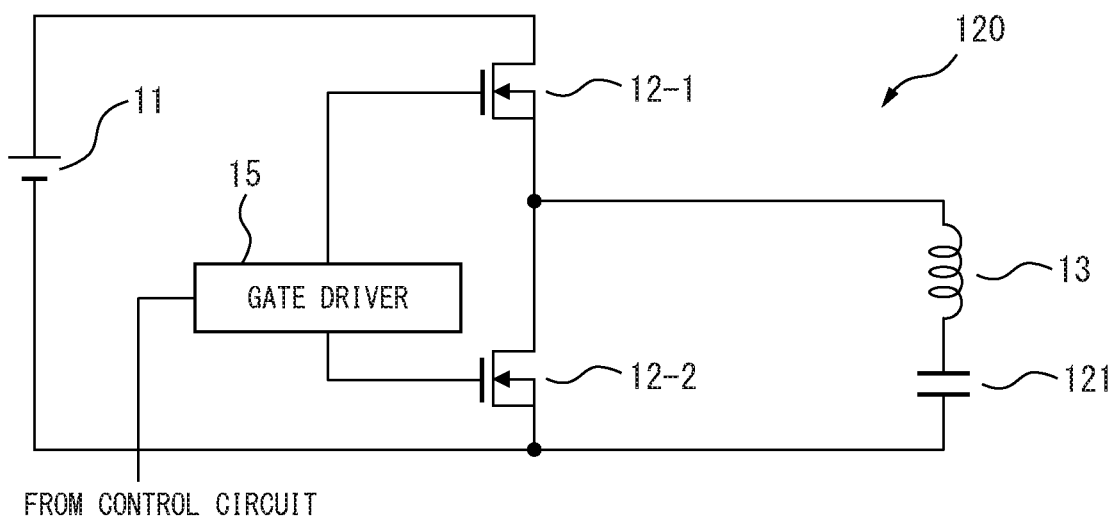
Figure 5C:
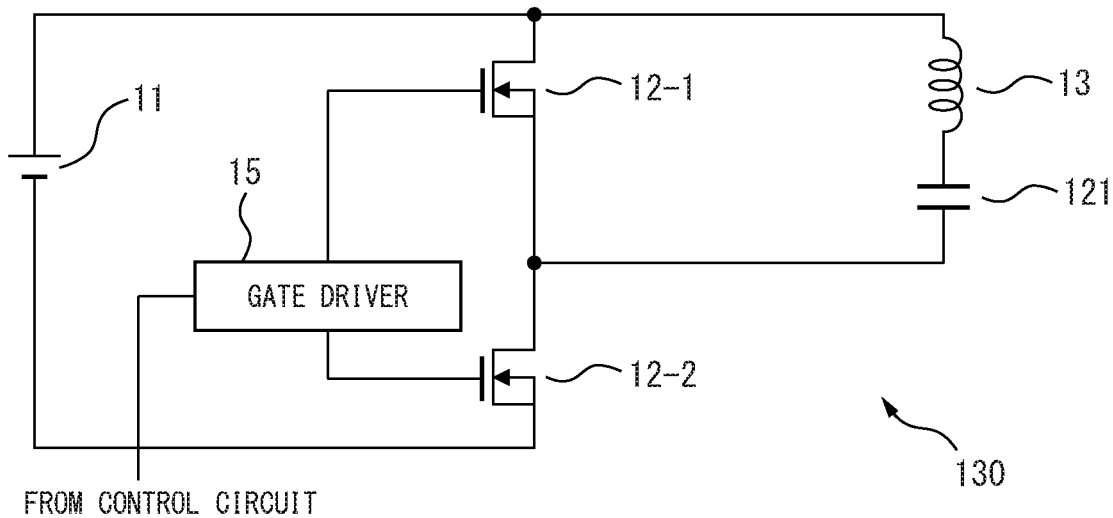

FIG. 5A to FIG. 5C are respectively circuit diagrams of power supply circuits according to variations. The power supply circuit 110 illustrated in FIG. 5A includes an AC power source 111 that adjusts a switching frequency under the control of the control circuit 16. The AC power from the AC power source 111 is directly supplied to the transmission coil 13. In this variation, therefore, the control circuit 16 may directly control the switching frequency of the AC power source 111 in accordance with the output voltage of the resonance circuit 20 of the power reception device 3.

The power supply circuit 120 illustrated in FIG. 5B includes a DC power source 11, two switching elements 12-1 and 12-2, and a capacitor 121 for blocking DC current connected in series with a transmission coil 13. Note that the switching elements may be, for example, n-channel MOSFETs also in this variation.

In this variation, the switching element 12-1 and the switching element 12-2 are connected in series between the positive electrode terminal and the negative electrode terminal of the DC power source 11. The switching element 12-1 is connected on the positive electrode side of the DC power source 11, whereas the switching element 12-2 is connected on the negative electrode side of the DC power source 11. The drain terminal of the switching element 12-1 is connected with the positive electrode terminal of the DC power source 11, and the source terminal of the switching element 12-1 is connected with the drain terminal of the switching element 12-2. The source terminal of the switching element 12-2 is connected with the negative electrode terminal of the DC power source 11. Furthermore, the source terminal of the switching element 12-1 and the drain terminal of the switching element 12-2 are connected with one end of the transmission coil 13, and the source terminal of the switching element 12-2 is connected with the other end of the transmission coil 13 via a capacitor 121. The gate terminals of the switching elements are connected with the gate driver 15.

In this variation, the gate driver 15 may switch on and off the switching element 12-1 and the switching element 12-2 alternatingly in accordance with a control signal from the control circuit 16, in other words, when the switching element 12-1 is turned on and the switching element 12-2 is turned off, a current passes from the DC power source 11 through the switching element 12-1 to the transmission coil 13 and the capacitor 121 is charged. On the other hand, when the switching element 12-1 is turned off and the switching element 12-2 is turned on, the capacitor 121 discharges and a current passes from the capacitor 121 through the transmission coil 13 and the switching element 12-2. In this variation, therefore, the control circuit 16 may control the switching frequency at which the switching element 12-1 and the switching element 12-2 are switched on and off by means of the gate driver 15 in accordance with the output voltage of the resonance circuit 20 of the power reception device 3.

The power supply circuit 130 illustrated in FIG. 5C includes a DC power source 11, two switching elements 12-1 and 12-2, and a capacitor 121 connected in series with the transmission coil 13, similarly to the power supply circuit 120. However, in the power supply circuit 130, unlike the power supply circuit 120, one end of the transmission coil 13 is directly connected with the positive electrode terminal of the DC power source 11, whereas the other end of the transmission coil 13 is connected via the capacitor 121 with the source terminal of the switching element 12-1 and the drain terminal of the switching element 12-2.

In this variation also, the gate driver 15 may switch on and off the switching element 12-1 and the switching element 12-2 alternatingly in accordance with a control signal from the control circuit 16.

Note that, for the power supply circuit 120 illustrated in FIG. 5B and the power supply circuit 130 illustrated in FIG. 5C, the capacitance of the capacitor 121 is preferably set in such a way that the resonance frequency of the transmission coil 13 and the capacitor 121 is smaller than the resonance frequency of the resonance circuit 20 of the power reception device 3 and the minimum frequency fmin of the frequency range in which the switching frequency is adjusted in order to prevent the transmission coil 13 and the capacitor 121 from operating as a resonance circuit in the frequency range in which the switching frequency is adjusted. This suppresses a decline in power transmission efficiency owing to an increase of the current passing through the transmission coil 13.

Further, similarly to the power supply circuit 120 and the power supply circuit 130, a capacitor for blocking DC current connected in series with the transmission coil 13 may be provided also in the above-described embodiment. However, also in this case, the capacitance of the capacitor is preferably set in such a way that the resonance frequency of the transmission coil 13 and the capacitor is smaller than the resonance frequency of the resonance circuit 20 of the power reception device 3 and the minimum frequency fmin of the frequency range in which the switching frequency is adjusted in order to prevent the transmission coil 13 and the capacitor from operating as a resonance circuit in the frequency range in which the switching frequency is adjusted.

Further, when it is possible to connect the receiver 14 of the power transmission device 2 and the transmitter 28 of the power reception device 3 through wire, the receiver 14 and the transmitter 28 may each include a communication circuit capable of communicating through wire a signal that includes information indicating a measured value of the output voltage.

As described above, a person skilled in the art can apply various alterations suitable to embodiments without departing from the scope of the present invention.

REFERENCE SIGNS LIST

1 Noncontact power supply apparatus
2 Power transmission device
10, 110, 120, 130 Power supply circuit
11 DC power source
12-1 to 12-4 Switching element
13 Transmission coil
14 Receiver
15 Gate driver
18 Control circuit
3 Power reception device
20 Resonance circuit
21 Reception coil
22 Capacitor
23 Rectification and smoothing circuit
24 Full-wave rectification circuit
25 Smoothing capacitor
26 Load circuit
27 Voltage detection circuit
28 Transmitter
111 AC power source
121 Capacitor

The invention claimed is:

1. A noncontact power supply apparatus comprising a power transmission device and a power reception device to which electric power is transmitted from the power transmission device without contact,
wherein the power reception device comprises:
   a resonance circuit that comprises a reception coil that receives electric power from the power transmission device and a resonance capacitor connected in parallel with the reception coil, the resonance circuit resonating at a first frequency;
   a voltage detection circuit that measures an output voltage from the resonance circuit and obtains a measured value of the output voltage; and
   a transmitter that transmits a signal including information indicating the measured value of the output voltage to the power transmission device, and
wherein the power transmission device comprises:
   a transmission coil that supplies electric power to the power reception device;
   a power supply circuit that supplies AC power having an adjustable switching frequency to the transmission coil;
   a receiver that receives the signal including the information indicating the measured value of the output voltage; and
   a control circuit that controls the switching frequency in accordance with the measured value of the output voltage that allows the transmission coil and the power supply circuit to continue a soft switching operation, in which a phase of a current passing through the transmission coil delays from a phase of a voltage of the AC power,
   wherein the power supply circuit includes switching elements connected between a power source which supplies DC power and the transmission coil, and
   wherein the power supply circuit converts the DC power to the AC power to supply the AC power to the transmission coil by switching the switching elements between on and off states in accordance with the switching frequency.

2. The noncontact power supply apparatus according to claim 1, wherein the control circuit controls the switching frequency within a frequency range that includes the first frequency at an anticipated coupling coefficient between the transmission coil and the reception coil.

3. The noncontact power supply apparatus according to claim 2,
   wherein a minimum frequency of the frequency range is equal to the first frequency at a minimum value of the anticipated coupling coefficient, and
   wherein the control circuit sets the switching frequency at a maximum frequency of the frequency range when the measured value of the output voltage exceeds a first voltage.

4. The noncontact power supply apparatus according to claim 1, wherein the control circuit controls the switching frequency to decrease a difference between the measured value of the output voltage and the output voltage in a case in which the resonance circuit resonates.

* * * * *